(12) United States Patent
Panchal et al.

(10) Patent No.: US 6,944,177 B2
(45) Date of Patent: Sep. 13, 2005

(54) METHOD AND APPARATUS FOR PROVIDING POWER CONTROL FOR CDMA DISPATCH SERVICES

(75) Inventors: Rajendra A. Panchal, Algonquin, IL (US); Jay Jayapalan, Buffalo Grove, IL (US); Alexander Rozenstrauch, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 166 days.

(21) Appl. No.: 10/434,541

(22) Filed: May 9, 2003

(65) Prior Publication Data

US 2004/0223471 A1 Nov. 11, 2004

(51) Int. Cl.⁷ .............................................. H04L 12/16
(52) U.S. Cl. ...................................... 370/441; 370/335
(58) Field of Search ................................. 370/311, 320, 370/329, 331, 332, 335, 342, 441, 350

(56) References Cited

U.S. PATENT DOCUMENTS

| 5,881,368 A | 3/1999 | Grob et al. |
| 5,887,252 A | 3/1999 | Noneman |
| 5,914,958 A | 6/1999 | Chinitz et al. |
| 6,115,388 A | 9/2000 | Chinitz et al. |
| 6,178,166 B1 * | 1/2001 | Wilson et al. ............... 370/335 |
| 6,233,461 B1 * | 5/2001 | Chinitz et al. .............. 455/522 |
| 6,292,671 B1 * | 9/2001 | Mansour ..................... 455/518 |
| 6,373,829 B1 | 4/2002 | Vilmur |
| 6,519,239 B1 | 2/2003 | Panchal et al. |
| 6,748,231 B2 * | 6/2004 | Pan et al. .................... 455/518 |
| 6,781,963 B2 * | 8/2004 | Crockett et al. ............ 370/260 |
| 6,788,941 B2 * | 9/2004 | Needham et al. ........... 455/442 |

FOREIGN PATENT DOCUMENTS

WO   PCT/US04/10777   *   4/2004   ................. 370/335

* cited by examiner

Primary Examiner—Dang Ton
(74) Attorney, Agent, or Firm—Jeffrey K. Jacobs

(57) ABSTRACT

To address the need to provide power control for listening participants of CDMA dispatch services, the concept of "shared channel signaling windows" for shared traffic channels (e.g., 110) is described. In one embodiment, the beginning of a signaling window is announced on the traffic channel and the remote units (e.g., MS 120) with the highest frame error rates compute the shortest transmit delays. For the duration of the window, remote units transmit their power control signaling according to their transmit delays. Thus, listening participants are given an opportunity, according to need, to perform power control signaling on the group traffic channel.

29 Claims, 3 Drawing Sheets

METHOD AND APPARATUS FOR PROVIDING POWER CONTROL FOR CDMA DISPATCH SERVICES

REFERENCE(S) TO RELATED APPLICATION(S)

This application is related to a co-pending application entitled "METHOD AND APPARATUS FOR CDMA SOFT HANDOFF FOR DISPATCH GROUP MEMBERS," filed on even date herewith, and assigned to the assignee of the instant application.

This application is related to a co-pending application, Ser. No. 10/027488, entitled "METHOD AND APPARATUS FOR CDMA-DISPATCH SOFT HANDOFF," filed Dec. 20, 2001, which is assigned to the assignee of the present application.

This application is related to a co-pending application, Ser. No. 10/027041, entitled "METHOD AND APPARATUS FOR MOBILE-INITIATED, CDMA-DISPATCH SOFT HANDOFF," filed Dec. 20, 2001, which is assigned to the assignee of the present application.

This application is related to a co-pending application, Ser. No. 10/027465, entitled "METHOD AND APPARATUS FOR BASE-INITIATED, CDMA-DISPATCH SOFT HANDOFF," filed Dec. 20, 2001, which is assigned to the assignee of the present application.

This application is related to a co-pending application, Ser. No. 09/588262, entitled "METHOD AND APPARATUS FOR SELECTING COMMUNICATION CELLS IN A WIRELESS COMMUNICATION SYSTEM," filed Jun. 6, 2002, which is assigned to the assignee of the present application.

This application is related to a co-pending application, Ser. No. 10/027193, entitled "METHOD AND APPARATUS FOR QUICKLY ESTABLISHING A CDMA DISPATCH CALL," filed Dec. 20, 2001, which is assigned to the assignee of the present application.

This application is related to a co-pending application, Ser. No. 10/027365, entitled "BASE SITE AND METHOD FOR QUICKLY ESTABLISHING A CDMA DISPATCH CALL," filed Dec. 20, 2001, which is assigned to the assignee of the present application.

This application is related to a co-pending application, Ser. No. 09/811213, publication number US-2002-0131380-A1, entitled "METHOD AND APPARATUS FOR PROVIDING A DISPATCH PATCH SERVICE IN A CDMA COMMUNICATION SYSTEM," filed Mar. 16, 2001, which is assigned to the assignee of the present application.

This application is related to a co-pending application, Ser. No. 09/781838, publication number US-2002-0110107-A1, entitled "CHANNEL STRUCTURE FOR DATA TRANSMISSION," filed Feb. 12, 2001, which is assigned to the assignee of the present application.

FIELD OF THE INVENTION

The present invention relates generally to communication systems and, in particular, to providing power control for CDMA dispatch services.

BACKGROUND OF THE INVENTION

CDMA systems are interference-limited systems. For example, the IS95/CDMA2000 standard seeks to minimize interference on reverse links (i.e., access channels) during call setup through the use of low power access probes. Additionally, the standard seeks to minimize interference during calls by using closed loop power control techniques.

For wireless telephone calls, the base station (BS) measures signal strength (E/I) received from the mobile subscriber (MS) and sends an up/down power adjustment instruction via a power control sub-channel (i.e., dedicated bits in a forward link frame). In turn, the MS measures frame error rate (FER), on the forward link, and reports these measurements to the BS using Power Measurement Report messages. In response, the BS adjusts its forward power.

In contrast to telephone calls, dispatch (or group) calls typically involve several MSs, all participating in the call. In a dispatch call, one MS is transmitting (i.e., in talk mode) while the other members of the group are receiving (i.e., in listening mode) at any given time. When the MS with the transmit prerogative releases its "Push-to-talk" (PTT), a message is sent to the BS, and the BS places the traffic channel in an "open mode." While in this mode, any other MS can request a transmit prerogative by signaling a PTT. The BS allocates a transmit prerogative to the first arriving request. While this description is for a single-cell call, it can be applied to a multi-cell call with the addition of a central dispatch call controller, which arbitrates transmit prerogative requests instead of a controlling BS.

In a CDMA system such as that described in U.S. Pat. No. 6,519,239 (U.S. patent application Ser. No. 09/443,538), entitled "METHOD AND APPARATUS FOR PROVIDING DISPATCH SERVICE IN A CDMA COMMUNICATION SYSTEM," group call voice frames are transmitted using standard CDMA traffic channel procedures except that a common long code is used instead of an individual long code computed from the MS's ESN. Thus, the MSs in the group call share a single traffic channel. However, in such a system, listening mode MSs cannot request forward power adjustment by the BS. As a result, distant listening MSs, which require greater forward power from the BS, may experience excessive frame error rates and unacceptable voice quality. Therefore, a need exists for an apparatus and method to provide power control for listening participants of CDMA dispatch services.

DETAILED DESCRIPTION OF EMBODIMENTS

To address the need to provide power control for listening participants of CDMA dispatch services, the concept of "shared channel signaling windows" for traffic channels is described. In one embodiment, the beginning of a signaling window is announced on the traffic channel and the remote units with the highest frame error rates compute the shortest transmit delays. For the duration of the window, remote units transmit their power control signaling according to their transmit delays. Thus, listening participants are given an opportunity, according to need, to perform power control signaling on the group traffic channel.

Figure 1:
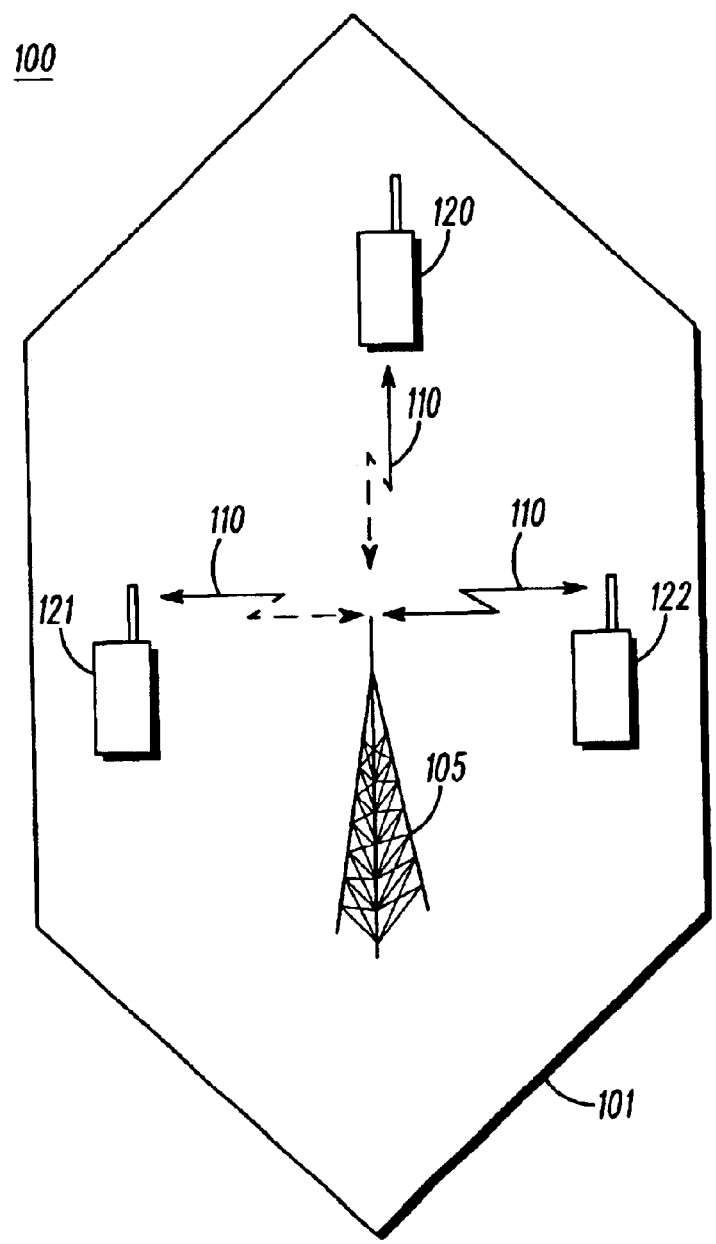
FIG. 1 is a block diagram depiction of a communication system in accordance with an embodiment of the present invention.

The disclosed embodiments can be more fully understood with reference to FIGS. 1–4. FIG. 1 is a block diagram depiction of a communication system 100 in accordance with a first embodiment of the present invention. Communication system 100 is a well-known Code Division Multiple Access (CDMA) system, specifically a CDMA2000 system, which is based on the Telecommunications Industry Association/Electronic Industries Association (TIA/EIA) standard IS-2000, suitably modified to implement the present invention. (The TIA/EIA can be contacted at 2001 Pennsylvania Ave. NW, Washington, D.C. 20006). In various embodiments, communication system 100 may utilize other cellular communication system protocols such as, but not limited to, IS-95.

Communication system 100 includes radio access network (RAN) entities, such as base site (BS) 105, which comprises one or more base transceiver stations (BTSs). BS 105 has a service coverage area depicted by service coverage area 101. Communication system 100 also includes remote units 120–122. However, the present invention is not limited to remote units that are mobile. Typically, a remote unit comprises a mobile station (MS), but it may instead comprise, for example, a desktop computer wirelessly connected to the RAN.

Those skilled in the art will recognize that FIG. 1 does not depict all of the network equipment necessary for system 100 to operate but only those system blocks and logical entities particularly relevant to the description of embodiments of the present invention. Those skilled in the art are aware of the many types of communication devices necessary for system 100 operation. Furthermore, those skilled in the art are aware of the many ways these entities can be implemented and/or purchased from wireless communications companies such as "MOTOROLA."

Figure 2:
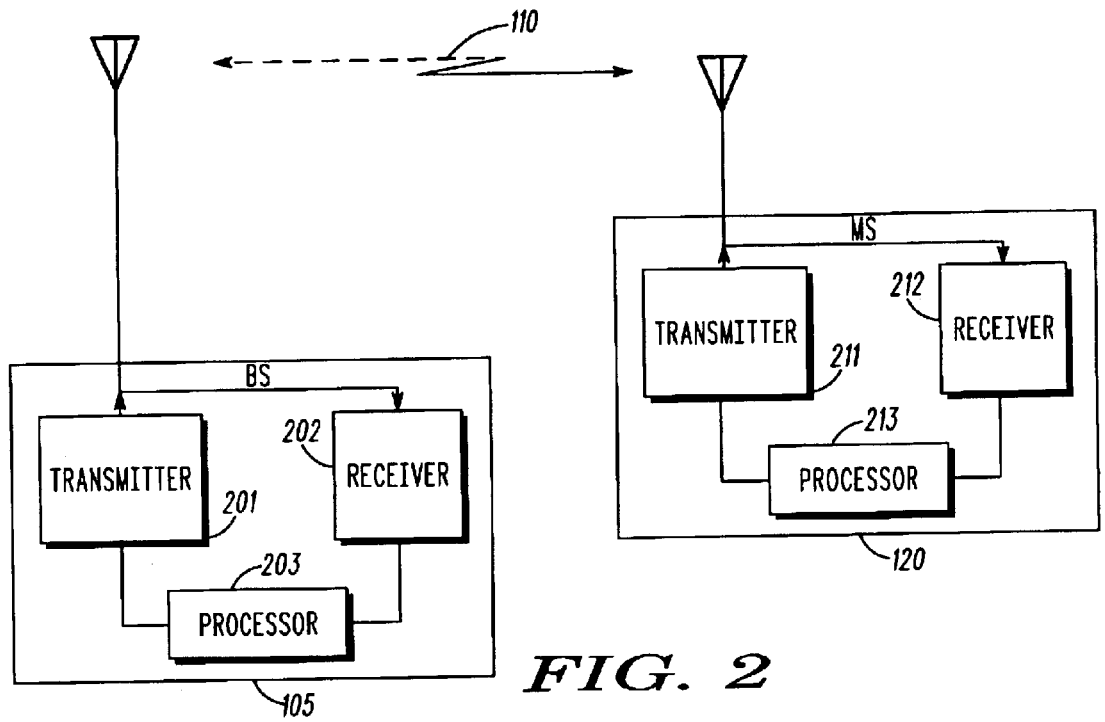
FIG. 2 is a block diagram depiction of a base site and mobile station in accordance with an embodiment of the present invention.

FIG. 2 is a block diagram depiction of base site 105 and mobile station 120 in accordance with the first embodiment of the present invention. BS 105 and MS 120 communicate via air interface resource 110. In the first embodiment, air interface resource 110 comprises a CDMA traffic channel for which a common long code is used instead of a CDMA2000 individual long code that is computed from an ESN. The use of a common long code is described in detail in U.S. Pat. No. 6,519,239 (U.S. patent application Ser. No. 09/443,538), referenced above. The use of a common long code allows MS 120–122 to share traffic channel 110.

MS 120 and BS 105 comprise well-known entities such as processors 203 and 213, transmitters 201 and 211, and receivers 202 and 212. Processors, for example, typically comprise components such as microprocessors, digital signal processors, memory, and/or logic circuitry designed to implement algorithms that have been expressed as computer instructions and/or in circuitry. Given an algorithm or a logic flow, those skilled in the art are aware of the many design and development techniques available to implement a processor that performs the given logic. In the first embodiment of the present invention, a known CDMA 2000 BS is adapted using known telecommunications design and development techniques to implement the logic flow depicted in FIG. 3. The result is BS 105. Similarly, a known CDMA 2000 MS is adapted using known telecommunications design and development techniques to implement the logic flow depicted in FIG. 4. The result is MS 120.

Operation of the first embodiment of the present invention occurs substantially as follows. MSs 120–122 are members of a dispatch group. Receiver 202 of BS 105 receives content for the dispatch group from a talking dispatch group member (MS 122) via traffic channel (TCH) 110. This content may include, for example, dispatch group call voice, video, data, text messaging, or any combination of these in the form of broadcast, multicast, or unicast information. The content transmitted by talking MS 122 is retransmitted by BS 105 via the forward link of traffic channel 110 and received by listening MS 121 and 120 (via receiver 212).

When processor 203 of BS 105 detects inactivity in the dispatch content, processor 203 sends, via transmitter 201, an indication to the dispatch group that power control signaling by non-talking (i.e., listening mode) dispatch group members may be transmitted for a period of time. Forward power control signaling such as an MS Power Measurement Report is an example of this type of signaling.

There are at least two types of inactivity detected by BS 105: a relative silence in dispatch group call voice activity and an indication from the talking dispatch group member that another group member may talk. MSs transmit voice at different rates depending on the voice activity. Active voice is transmitted at full rate and half rate, while low activity voice or relative silence is transmitted at quarter rate and eighth rate. Consequently, the BS can detect a low activity or silence period (e.g., via Rate Determination Algorithm (RDA)) by the frame rate. Thus, BS 105 can detect inactivity when at least one eighth rate frame is detected in the dispatch content.

Thus, BS 105 schedules a signaling window so as to minimally affect voice quality. Once low activity/relative silence is detected, the BS issues a "Temporary Transmit Prerogative Suspension" message utilizing a Blank&burst or Dim&burst voice frame coded with TCH 110's common long mask. MSs 120–122 decode it and interpret the message as an indication to perform power control signaling. The "Temporary Transmit Prerogative Suspension" expires after either an indicated or pre-defined number of voice frames (or period of time), and MS 122 then resumes transmitting its voice frames.

Another type of inactivity detected by BS 105 is an indication from the talking dispatch group member (MS 122) that another group member may talk, e.g., a push-to-talk (PTT) release indication. In dispatch call control, after receiving a PTT release from the talking MS, the BS transmits an Order message telling the group MSs that the channel is in an OPEN MODE. Since there is a considerable amount of time between the detection of an open channel by the MS and another user requesting PTT (i.e., requesting a transmit prerogative), this interval lends itself as another power control signaling window. Thus, similar to the "Temporary Transmit Prerogative Suspension" message, an Order message can also indicate that power control signaling may be transmitted. It is possible that a silence or a low activity period preceding the talker releasing PTT may cause the BS to signal a "Temporary Transmit Prerogative Suspension" window prior to the channel going to an OPEN MODE. In these cases, the window can be extended during the OPEN MODE to allow MSs with higher transmit time delays (as discussed below) to transmit.

Listening MS 120 (i.e., processor 213 via receiver 212) receive the dispatch content via TCH 110's forward link and compute frame error rates (FERs) for the content on the forward link. The FER(s) is compared to a threshold when receiver 212 of listening MS 120 receives the indication that power control signaling may be transmitted. In the first embodiment, this threshold is set to a value of 3% since voice usually cannot tolerate more errors; however, certainly this value can be tuned for more optimal performance in other embodiments. If the threshold is exceeded, processor 213 determines a transmit delay based on the FER/FERs. Since all listening MSs (such as MS 121) are also comparing their FERs to the threshold, only those with excessive FERs compete for the signaling window by determining a transmit delay. This delay is used to reduce the probability of collision on the common traffic channel. However, depending on the window size, the computed transmit delay may in reality amount to a boolean transmit or not indicator, such as when the computed delay does not fit into the window.

Ideally, the MSs compute their transmission delay in such a way that the MS with the highest FER(s) computes the shortest delay. In general, however, a greater transmit delay is determined for a smaller frame error rate. Additional thresholds may be tiered in to map FER ranges to transmit delays. In fact, a highest threshold may be used, above which, the transmit delay is determined to be zero.

As described above, then, processor 213 of MS 120 delays transmission of its power control signaling based on the transmit delay determined. After delaying and assuming the transmit delay is within the signaling window, MS 120 transmits and BS 105 receives the power control signaling via TCH 110. Thus, this first embodiment of the present invention enables a controlling BS to compute its forward power adjustment based on the power control signaling of at least the most power-needy MSs in the group.

Figure 3:
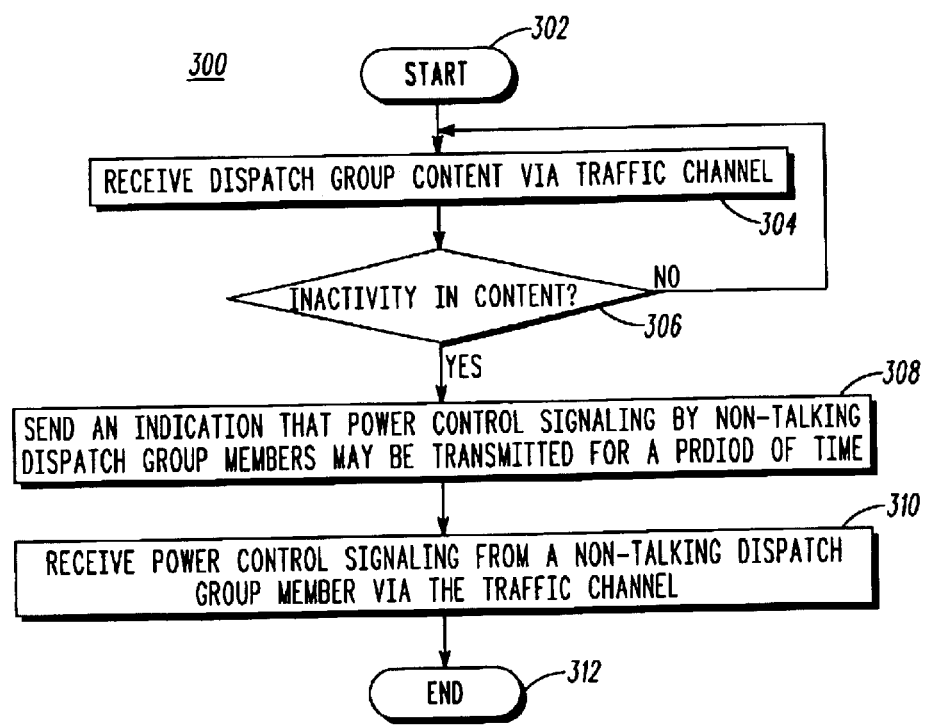
FIG. 3 is a logic flow diagram of a method executed by a base site in accordance with an embodiment of the present invention.

FIG. 3 is a logic flow diagram of a method executed by a base site in accordance with the first embodiment of the present invention. Logic flow 300 begins (302) with the base site receiving (304) dispatch group content via a TCH common to the group. When (306) the base site detects sufficient inactivity in the received content, it transmits (308) an indication to the non-talking group members that power control signaling may be transmitted for a period of time. In response, the base site receives (310) power control signaling from at least one non-talking group member via the common traffic channel, and adjusts its forward power accordingly. Logic flow 300 thus ends (312).

Figure 4:
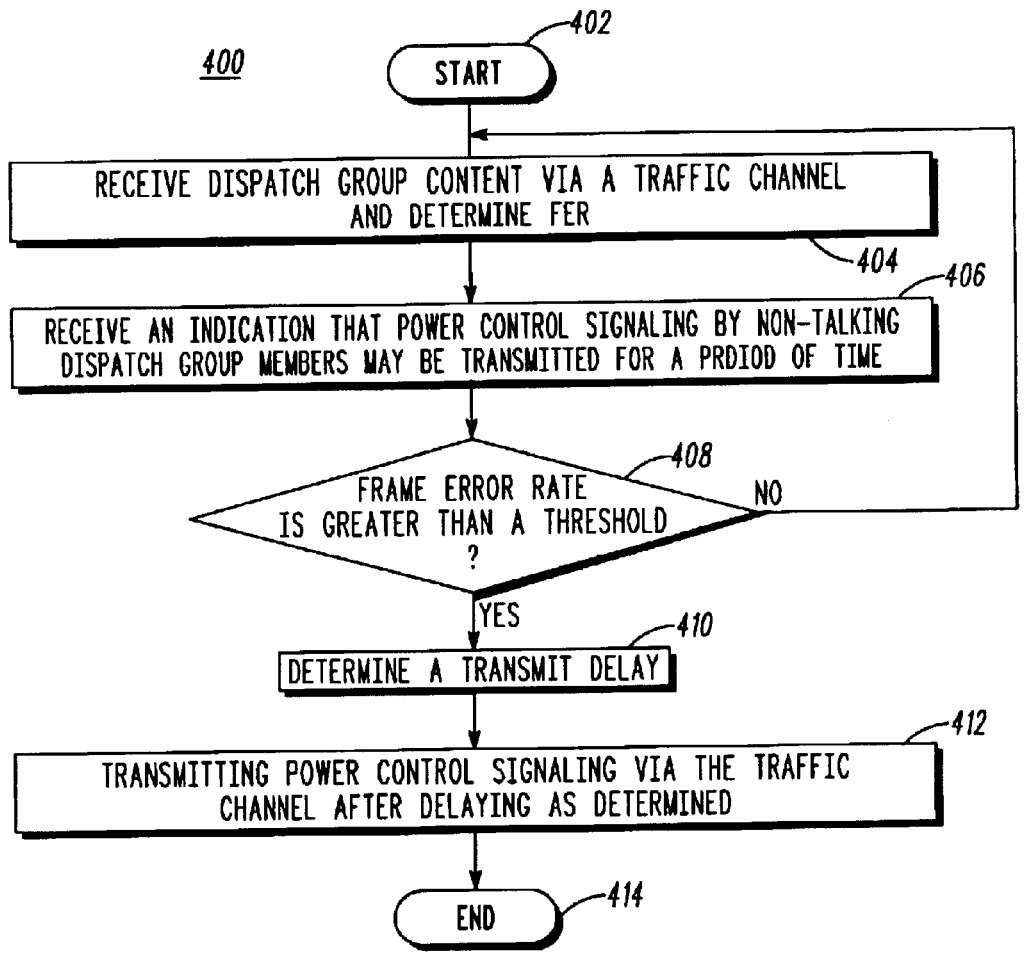
FIG. 4 is a logic flow diagram of a method executed by a remote unit in accordance with an embodiment of the present invention.

FIG. 4 is a logic flow, diagram of a method executed by a remote unit in accordance with an embodiment of the present invention. Logic flow 400 begins (402) with the remote unit receiving (404) dispatch group content via a traffic channel common to the group and determining a FER of the content received. At some point, the remote unit receives (406) an indication that power control signaling by non-talking group members may be transmitted for a period of time. The remote unit compares (408) the FER determined to a threshold. If it is greater, then the remote unit determines (410) a transmit delay. The remote unit delays transmission based on the transmit delay determined, and assuming the signaling window is still open, it transmits (412) its power control signaling to the base site. Logic flow 400 thus ends (414).

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method for providing power control for CDMA dispatch services comprising:
    receiving content for a dispatch group from a talking dispatch group member via a traffic channel;
    when inactivity is detected in the dispatch content, sending an indication to the dispatch group that power control signaling by non-talking dispatch group members may be transmitted; and
    in response to sending the indication, receiving power control signaling from a non-talking dispatch group member via the traffic channel.

2. The method of claim 1, wherein sending an indication that power control signaling may be transmitted comprises sending an indication that power control signaling may be transmitted for a period of time.

3. The method of claim 2, wherein the period of time is a fixed, pre-defined period of time.

4. The method of claim 1, wherein content for a dispatch group comprises content selected from the group consisting of dispatch group call voice, video, data, and text messaging.

5. The method of claim 1, wherein inactivity in the dispatch content comprises a relative silence in dispatch group call voice activity.

6. The method of claim 5, wherein the indication that power control signaling may be transmitted comprises a Temporary Transmit Prerogative Suspension message.

7. The method of claim 1, wherein inactivity is detected in the dispatch content when at least one eighth rate frame is detected in the dispatch content.

8. The method of claim 1, wherein inactivity in the dispatch content comprises an indication from the talking dispatch group member that another group member may talk.

9. The method of claim 8, wherein the indication from the talking dispatch group member that another group member may talk comprises an indication from the talking dispatch group member of a push-to-talk (PTT) release.

10. The method of claim 9, wherein the indication that power control signaling may be transmitted comprises an order message indicating a dispatch open mode.

11. The method of claim 1, wherein power control signaling comprises a Power Measurement Report message.

12. A method for providing power control for CDMA dispatch services comprising:
   receiving dispatch group content via a traffic channel;
   receiving an indication that power control signaling by non-talking dispatch group members may be transmitted; and
   in response to receiving the indication, transmitting power control signaling via the traffic channel.

13. The method of claim 12, further comprising determining a transmit delay.

14. The method of claim 13, further comprising, after receiving the indication, delaying transmission of the power control signaling based on the transmit delay determined.

15. The method of claim 13, wherein determining the transmit delay comprises determining a frame error rate for content received via the traffic channel.

16. The method of claim 15, wherein the transmit delay is determined to be zero when the frame error rate is greater than a threshold.

17. The method of claim 15, wherein a greater transmit delay is determined for a smaller frame error rate.

18. The method of claim 12, further comprising:
   determining a frame error rate for content received via the traffic channel; and
   when the frame error rate is greater than a threshold, determining a transmit delay based on the frame error rate.

19. The method of claim 12, wherein receiving the indication comprises receiving an indication that power control signaling may be transmitted for a period of time.

20. The method of claim 19, wherein the period of time is a fixed, pre-defined period of time.

21. The method of claim 12, wherein the indication that power control signaling may be transmitted comprises a Temporary Transmit Prerogative Suspension message.

22. The method of claim 12, wherein the indication that power control signaling may be transmitted comprises an Order message indicating a dispatch open mode.

23. The method of claim 12, wherein power control signaling comprises forward power control signaling.

24. The method of claim 23, wherein power control signaling comprises a Power Measurement Report message.

25. A base site comprising:
   a transmitter;
   a receiver; and
   a processor, coupled to the transmitter and the receiver, adapted to receive content for a dispatch group tram a talking dispatch group member via the receiver and a traffic channel, adapted to send, via the transmitter, an indication to the dispatch group that power control signaling by non-talking dispatch group members may be transmitted, when inactivity is detected in the dispatch content, and adapted to receive power control signaling from a non-talking dispatch group member via the traffic channel in response to sending the indication.

26. A remote unit comprising:
   a transmitter;
   a receiver; and
   a processor, coupled to the transmitter and the receiver, adapted to receive dispatch group content via the receiver and a traffic channel, adapted to receive an indication that power control signaling by non-talking dispatch group members may be transmitted, and adapted to transmit power control signaling via the transmitter and the traffic channel in response to receiving the indication.

27. The remote unit of claim 26, wherein the processor is further adapted to determine a transmit delay.

28. The remote unit of claim 27, wherein the processor is further adapted to delay transmission of the power control signaling based on the transmit delay determined, after receiving the indication.

29. The remote unit of claim 26, wherein the processor is further adapted to determine a frame error rate for content received via the traffic channel and adapted to determine a transmit delay based on the frame error rate, when the frame error rate is greater than a threshold.

* * * * *